UNITED STATES PATENT OFFICE.

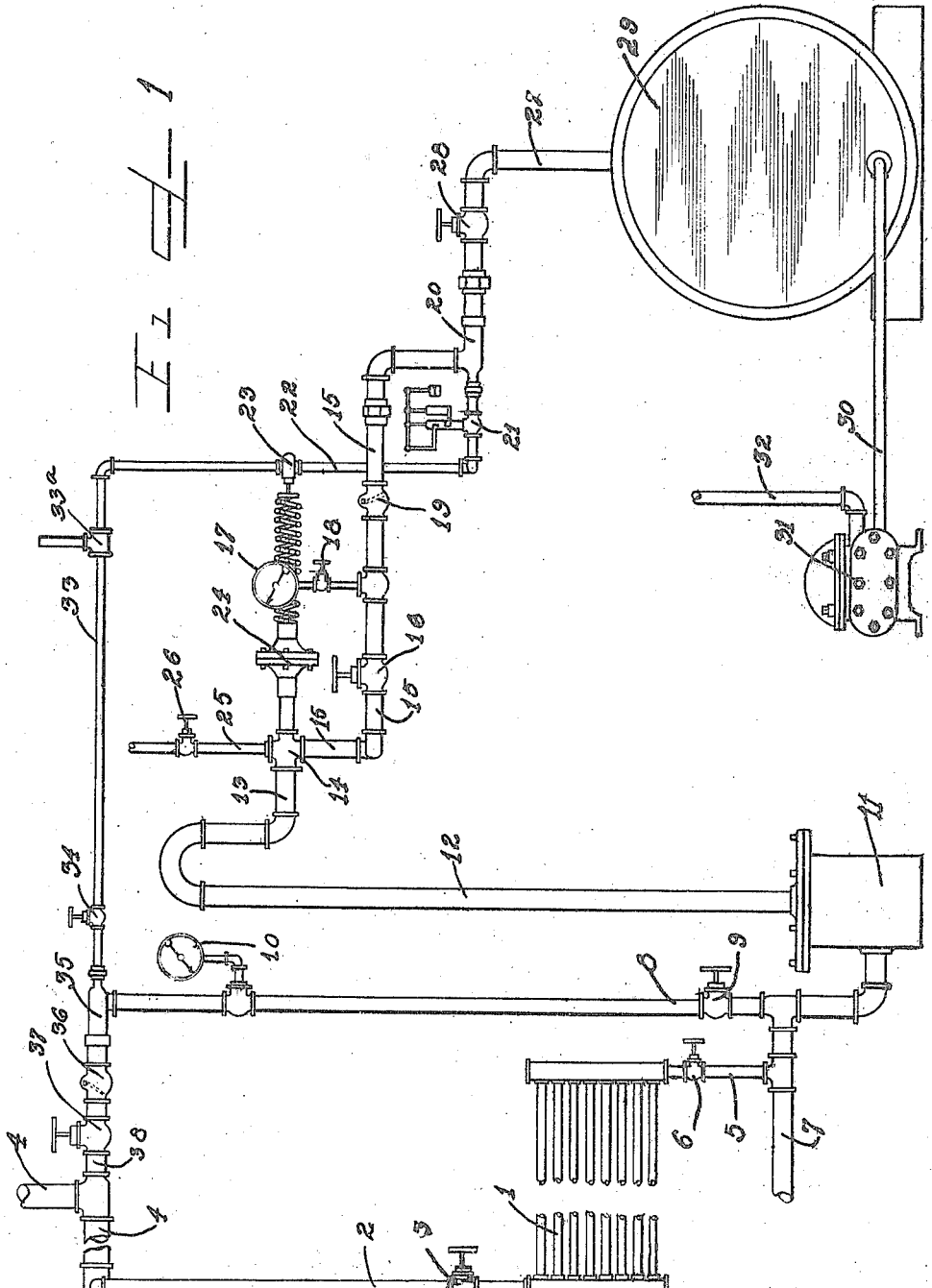

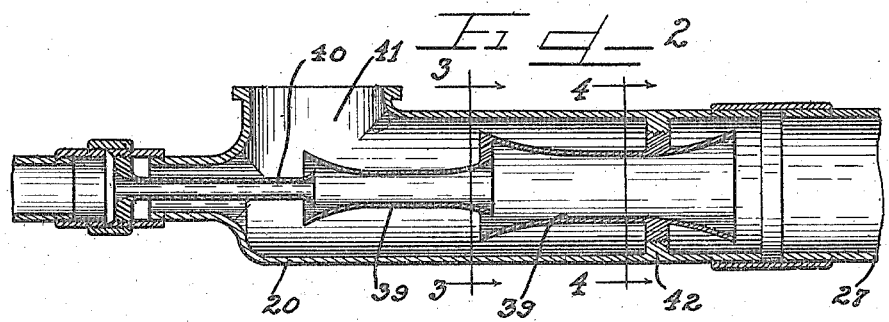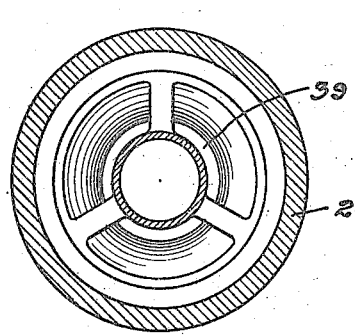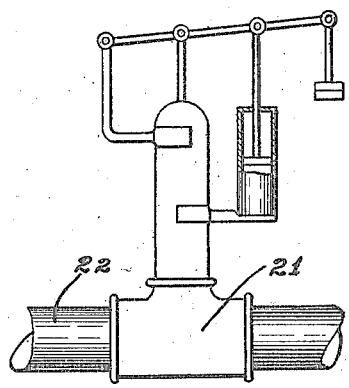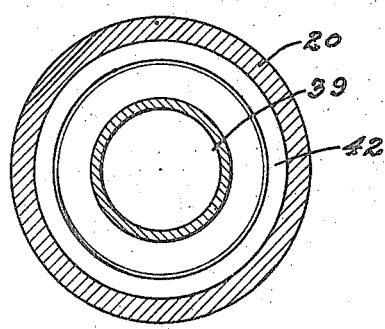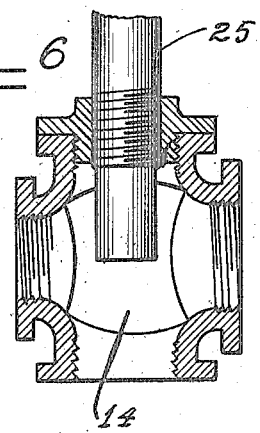

JOHN G. BROMAN, OF CHICAGO, ILLINOIS.

LOW-PRESSURE-RETURN HEATING SYSTEM.

1,263,845.        Specification of Letters Patent.        Patented Apr. 23, 1918.

Application filed April 30, 1917. Serial No. 165,380.

*To all whom it may concern:*

Be it known that I, JOHN G. BROMAN, a citizen of the United States, and a resident of the city of Chicago, in the county of Cook and State of Illinois, have invented certain new and useful Improvements in Low-Pressure-Return Heating Systems; and I do hereby declare that the following is a full, clear, and exact description of the same, reference being had to the accompanying drawings, and to the numerals of reference marked thereon, which form a part of this specification.

This invention relates to an automatic mechanism for effecting return of water of condensation from a heating system to a return tank, and for maintaining a low pressure or vacuum in the return of the heating system for removal of vapor as well as air, so that a positive flow of hot steam for heating purposes is permitted to take place into the radiators or other heating elements. By this invention, the maintenance of a predetermined low pressure or vacuum in the return lines is made entirely automatic and a governor mechanism is provided which is adjusted for a certain pressure to insure the maintenance of pressure below a particular point in the vacuum line.

It is an object therefore of this invention to construct an automatic vacuum return system for use in connection with a heating system to effect return of the water of condensation from the heating elements of the system, and to maintain a pressure in the return lower than that in the supply lines to insure a positive flow of the heating fluid into the heating elements.

It is also an object of this invention to construct a vacuum return system for a heating installation provided with a governor controlled steam injector for inducing a vacuum in the return lines, and with automatic means susceptible to different pressures in the vacuum line controlling the flow of steam to the governor and injector to maintain substantially a predetermined vacuum in the return line.

It is furthermore an important object of this invention to construct a vacuum system operating automatically to maintain a reduced pressure in the return lines of a heating system whereby the water of condensation is returned to a return tank and a low pressure maintained throughout the return lines to insure proper operation of the heating elements using low pressure steam such as exhaust steam from the engine.

Other and further important objects of the invention will be apparent from the disclosure in the drawings and specification.

The invention (in a preferred form) is illustrated in the drawings and hereinafter more fully described.

On the drawings:

Figure 1 is a diagrammatic layout of a system embodying the principles of my invention.

Fig. 2 is a sectional detail through an injector used in the system.

Fig. 3 is a sectional detail on line 3—3 of Fig. 2.

Fig. 4 is a sectional detail on line 4—4 of Fig. 2.

Fig. 5 is a detail view of the governor control valve for steam admitted to the injector.

Fig. 6 is a sectional detail through one of the fitting connections of the system.

As shown on the drawings:

The reference numeral 1, indicates a typical radiator or other heating element of a heating system and leading thereinto is a steam line 2, provided with a valve 3, the steam line 2, generally, though not necessarily, receiving low pressure steam from an engine exhaust line 4. The outlet or return line from the radiator 1, is denoted by the reference numeral 5, and is provided with a valve 6, and of course, any automatic thermostatic valve generally used in vacuum heating systems may also be used. The pipe 5, communicates through the pipe 7 with a main return line 8, the latter provided with a valve 9, near the junction thereof with the pipe 7, and at any convenient point also provided with a vacuum gage 10. The return line 8, leads into a water trap 11, and leading upwardly from the water trap 11, is a looped pipe line 12. The pipe loop 12, is connected to a pipe 13, which may be of any length whatsoever and which communicates into a 4-way coupling or fitting 14. Connected into the lower end of the coupling 14, is a pipe 15, provided with a valve 16.

Also connected into the pipe line 15, is a vacuum gage 17, provided with a valve 18, and beyond the connection of said vacuum gage 17, to said pipe 15, is a check valve 19, which permits flow only from left to right in the pipe 15, referring to Fig. 1. Said pipe 15, communicates into a steam injector 20, by which a vacuum is induced in the line 15. Leading into said injector 20, to supply live steam thereto, is a pipe provided with a governor valve 21, by which the steam admitted into the injector 20, is always maintained at a predetermined pressure irrespective of the pressure of the steam in the supply line 22, leading to the governor valve.

A control valve 23, is connected into the steam line 22, and is actuable by a diaphragm governor or control mechanism 24, which communicates with the 4-way coupling 14, of the vacuum line. Also leading into said 4-way coupling 14, of the vacuum line, is a cold water inlet pipe 25, provided with a valve 26. Connected into the outlet of the injector 20, is a pipe 27, provided with a valve 28, which leads into a return tank 29. Leading from the return tank 29, is an outlet pipe 30, which communicates with a boiler feed pump 31, having an outlet 32, for pumping water into the boiler.

A branch line 33, is connected with the main steam line 22, and is provided with a valve 34. The branch line 33, is connected with a high pressure steam pipe 33ª, which conducts live steam from its source to the pipes 22 and 33. Said branch line leads into a steam injector 35, with which the main return line 8, also communicates, so as to utilize the suction effect of the injector 35, when desired. Connected to the outlet of the injector 35, is a check valve 36, and beyond the check valve 36, is a valve 37, and a pipe connection 38, leads therefrom into the exhaust steam supply line 4.

In the detail view shown in Fig. 2, it will be seen that the injector 20, consists of an outer casing with a double nozzle structure 39, mounted therein, and projecting into the inlet end of the double nozzle structure is a steam nozzle 40, which receives steam from the steam supply line controlled by the governor valve 21, described. The flow of the steam admitted through the nozzle 40, and through the double nozzle 39, produces a vacuum in the large inlet 41, of the injector casing into which the pipe 15, communicates, referring to Fig. 1. The fluid entering by the inlet 41, flows into the first section of the double nozzle 39, at the point of entrance of the nozzle 40, therein, and also into the second section of the nozzle 39, and leaves through the second nozzle section into the outlet pipe from the nozzle, in the present instance the pipe 27. The second section of the nozzle 39, is threaded rigidly into an annular interior extension 42, of the casing 20, thus supporting the double nozzle in proper position.

The valve 21, is of a type adapted to maintain a predetermined outlet pressure of steam therefrom, even though the pressure of the inlet steam may vary. The particular construction, however, of this governor valve forms no part of the present invention.

The operation is as follows:

In starting the system, the valve 37, may be opened as well as the valve 34, permitting a flow of live steam to the steam supply line 2, of the heating element through the injector 35, thereby inducing a vacuum in the return lines 5, 7 and 8, which is indicated by gage 10. The valves 34 and 37, are then closed although the check valve 36, makes it unnecessary to close the valve 37, and the valve 28, is opened. This permits a flow of steam to take place through the injector 20, from the main steam line 22, and the automatic check valve 19, then opens to permit the vacuum created by the injector 20, to be transmitted through the pipe line 15, the valve 16, of course, being open. This induces vacuum through the pipe loop 12, and any water of condensation in the trap 11, is drawn upwardly through the pipe 12, and if sufficient water is collected to entirely fill the pipe line system 12—15—27, the siphon effect of the water will serve to aid in effecting transmission thereof. In any event, the suction effect induced by the injector 20, serves to transfer the water or water vapor into the return tank 29. The vacuum in the return line 15, is indicated by the gage 17, and is controlled by the governor 24. The pressure governor 24, is responsive to any variations in pressure occurring in the pipe 13, and moves the control valve 23, to such a position as to permit sufficient steam to pass to the injector 20, to keep the pressure in said pipe constant. This action will continue as long as the pressure of the steam in pipe 22, is not abnormally high, and during which time the pressure reducing valve 21, will remain wide open so as not to affect the controlling action of valve 23, but in case, for any reason, the valve 23, fails to reduce the steam pressure in pipe 22, below the pressure for which valve 21 is set, valve 21, will come into play to prevent such abnormally high pressure steam from being admitted to the injector. If additional water is desired in the return tank 29, for feed to the boiler, the valve 26, is opened, permitting an inlet of water through the pipe 25, coupling 14, and the introduction of the cold water will serve to condense any water vapor in the return lines 15—27, thus inducing a vacuum effect therein.

I am aware that various details of construction may be varied through a wide range without departing from the principles of this invention, and I therefore do not purpose limiting the patent granted otherwise than necessitated by the prior art.

I claim as my invention:

1. The combination with a heating system, of a vacuum system comprising a water trap, a pipe line communicating thereinto leading from the heating elements of the system, an outlet pipe loop leading upwardly from the water trap, a steam injector, a pipe connection between said pipe loop and said steam injector, a return tank, a steam admission pipe connected with the inlet of the steam injector, and a pipe connection from the outlet of the steam injector leading to said return tank whereby the water is lifted from the trap due to the suction effect of the injector, and caused to flow to the return tank.

2. The combination with a heating system and return lines from said heating system, of a water trap into which said return lines communicate, a pipe loop leading upwardly from the water trap, a steam injector with which said pipe loop communicates, a steam admission pipe connected with said injector, a control valve therein, a governor for actuating said control valve and responsive to pressure in said pipe loop whereby the flow of steam into said injector will be varied according to the suction exerted in the pipe loop by the steam injector, and a governor valve for said steam injector connected in said steam admission pipe between the injector and said control valve for regulating the flow of steam into said injector.

3. A vacuum return system for a heating installation comprising a trap, a pipe loop leading upwardly therefrom, pipe connections leading from said loop, a steam inlet pipe, a control valve therein, an injector in said pipe into which said pipe connections communicate, a governor valve in said steam inlet pipe for controlling the flow of steam into said injector, and a governor connected into the pipe connections susceptible to variations in pressure in said pipe connections to control said control valve.

4. A vacuum return system for a heating installation comprising a water trap, a siphon loop leading upwardly therefrom, pipe connections leading from said siphon loop, a steam admission pipe, a steam injector therein into which said pipe connections communicate, a valve in said admission pipe controlling the flow of steam into said injector, a governor controlling the operation of said valve and communicating with said pipe connections and responsive to the vacuum therein, a governor valve in said admission pipe connected to said steam injector to regulate the flow of steam entering the injector to a certain pressure, and an outlet pipe leading from said injector.

5. A heating system comprising in combination with the heating elements, a vacuum return line therefor, a water trap with which said vacuum return line communicates, a pipe loop leading upwardly from said water trap, pipe connections leading from said pipe loop, a steam admission pipe, a steam injector therein with which said pipe connections communicate, a check valve in said connections, a governor valve connected into said steam admission pipe for regulating the flow of steam to said injector, a control valve in said admission pipe for regulating the flow of steam to said governor valve, a governor in said pipe connections for controlling said control valve, a return tank, and pipe connections from the outlet of said injector to said return tank.

6. A heating system comprising in combination with the heating elements, a vacuum return line therefor, a water trap with which said vacuum return line communicates, a pipe loop leading upwardly from said water trap, pipe connections leading from said pipe loop, a steam admission pipe, a steam injector therein with which said pipe connections communicate, a check valve in said connections, means connected in said steam admission pipe for regulating the flow of steam to said injector, a pressure device controlling said means, a return tank, and pipe connections from the outlet of said injector to said return tank.

7. A vacuum return system for a heating installation comprising a trap, a pipe loop leading therefrom, pipe connections leading from said loop, a steam inlet pipe, a control valve therein, an injector in said steam inlet pipe into which said pipe connections communicate, and a governor connected into the pipe connections susceptible to variations in pressure in said pipe connections to control said control valve.

8. A vacuum return system for a heating installation comprising a trap, a pipe loop leading therefrom, pipe connections leading from said pipe loop, a steam inlet pipe, an injector in said steam inlet pipe into which said pipe connections communicate, a mechanism in said steam inlet pipe for controlling the flow of steam into said injector, and a governor connected into the pipe connections susceptible to variations in pressure in said pipe connections to control said control mechanism.

In testimony whereof I have hereunto subscribed my name in the presence of two subscribing witnesses.

JOHN G. BROMAN.

Witnesses:
 CHARLES W. HILLS, Jr.,
 EARL M. HARDINE.

Copies of this patent may be obtained for five cents each, by addressing the "Commissioner of Patents, Washington, D. C."